No. 622,223. Patented Apr. 4, 1899.
J. J. HARRELL.
REVOLVING CAR SIGNAL.
(Application filed Oct. 23, 1897. Renewed Feb. 27, 1899.)
(No Model.)
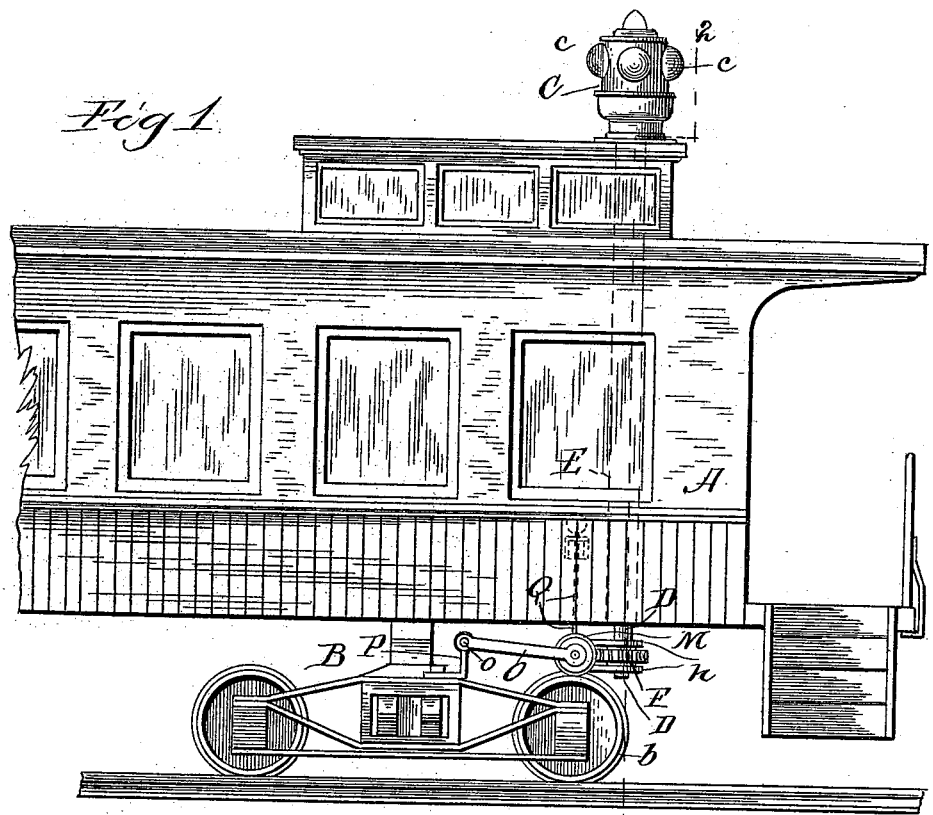
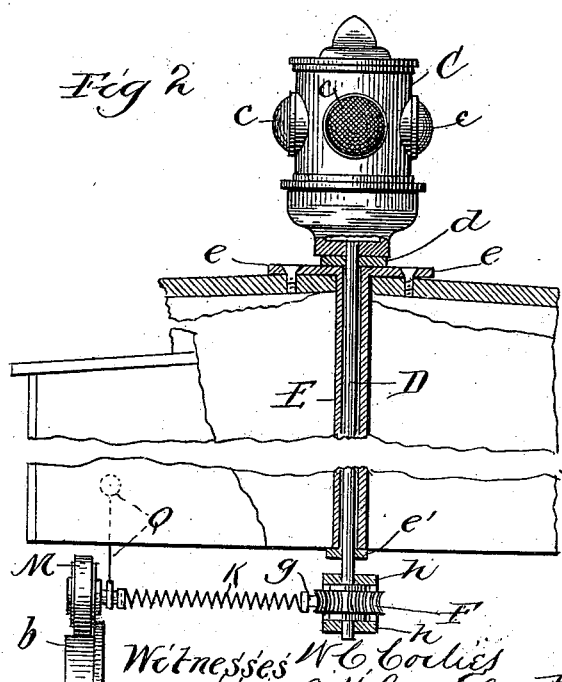
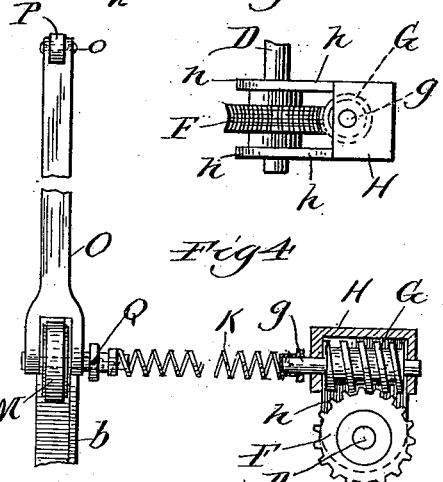
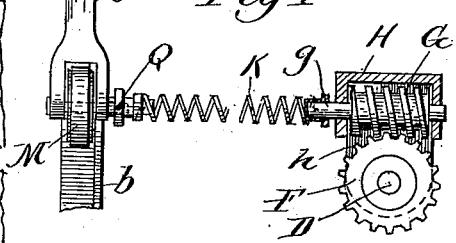
Inventor
Joseph J. Harrell

UNITED STATES PATENT OFFICE.

JOSEPH J. HARRELL, OF CHICAGO, ILLINOIS.

REVOLVING CAR-SIGNAL.

SPECIFICATION forming part of Letters Patent No. 622,223, dated April 4, 1899.

Application filed October 23, 1897. Renewed February 27, 1899. Serial No. 707,090. (No model.)

*To all whom it may concern:*

Be it known that I, JOSEPH J. HARRELL, a citizen of the United States, and a resident of Chicago, in the county of Cook and State of Illinois, have invented certain new and useful Improvements in Railway Signal-Lamps; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates particularly to lamps used in connection with the rear ends of trains for the purpose of signaling following trains.

The object is to provide a signal-lamp of this character which by means of rotation will indicate the movement of the train carrying it, being rotated in one direction when the train is advancing and in the opposite direction when the train is backing, and the speed at which the train is moving being indicated by the rapidity of rotation. Another important service for the lamp is to indicate to the engineer of the train carrying it that the train is intact, so that if in starting or under any circumstances the train becomes divided the lamp will indicate that fact to him.

The invention consists of a rotatable lamp preferably having several light-emitting apertures provided with lenses differing in color, in combination with the particular means for imparting rotation to the lamp from the running-gear of the train, as hereinafter fully described.

In the accompanying drawings, Figure 1 is a side elevation of a portion of the car carrying my improved lamp. Fig. 2 is a condensed sectional view on the line 2 2 of Fig. 1, and Figs. 3 and 4 are details of the driving mechanism for the lamp.

The car-body is shown at A, being in the case of a freight-train the caboose, which is attached to the rear end of the train, and one of its trucks is shown at B. The lamp C is preferably cylindrical in form and is mounted on the roof of the car and in the case of the caboose of a freight-train upon the roof of the lookout-cupola. This lamp has a plurality of light-emitting apertures or bull's-eyes $c\,c$, and the lenses may differ in color, so that the lamp will be the more conspicuous. A driving-shaft D is journaled within a tubular casing E, which extends vertically through the car, and the lamp is fixed upon the upper end of the same. The casing E has at its upper end a lateral flange $e$, adapted to rest upon the roof of the car, its upper surface constituting a bearing for a washer $d$, upon which the bottom of the lamp rests. A collar $e'$ is fitted upon the shaft D at the lower end of the casing E, so as, with the lamp, to prevent vertical play of the shaft. A worm-gear F is fixed upon the lower end of the shaft D and intermeshes with and is driven by a worm-shaft G, journaled within a casing H, having a pair of projecting arms $h$, which encompass the shaft D the one above and the other below the worm-gear F, so that the shaft constitutes a pivot for the case. A flexible shaft K, preferably in the form of a central spiral spring, is attached at one end to the spindle $g$ of the worm-shaft G and at the other end to the spindle of a friction-wheel M, which is journaled in an arm O, pivoted at $o$ to a bracket-arm P, fixed to the truck B in such position that the wheel M may rest upon the peripheral face of one of the car-wheels $b$. A pull-rod or cable Q is connected with the wheel M and passes up into the car, so that the wheel may at pleasure be raised from contact with the car-wheel. In operation the friction-wheel M is rotated by the car-wheel and communicates a rotary motion to the lamp through the flexible shaft K, the worm-shaft G, the worm-gear F, and the shaft D, the speed of rotation corresponding, of course, with the speed at which the train is moving and the direction of rotation being controlled by the direction of movement of the train. By making the various parts of the signal-lamp and its mechanism of uniform size for any railroad system the trainmen can determine at a glance whether the train is moving and the direction and speed of its movement.

The flexible shaft and the pivotal mounting of the casing H are employed for the reason that the worm-gear F is carried by the car-body, while the friction-wheel M is carried by the truck, and in practice there is a constant relative movement of these two portions of the car which it is necessary to compensate for in the lamp-driving mechanism.

I claim as my invention—

1. The combination with a railway-car having trucks, of a revoluble lamp mounted upon the car, and a shaft leading through the car for rotating the lamp, of a worm-gear secured upon the shaft, a worm-shaft for driving the gear, a flexible shaft secured to the worm-shaft, an arm pivoted to the truck so as to swing vertically, a friction-wheel carried by the swinging arm so as to rest upon the tread portion of the wheel of the truck, and connection between the friction-wheel and the flexible shaft.

2. The combination with a railway-car having trucks, of a revoluble lamp mounted upon the car, and a shaft leading through the car for rotating the lamp, a worm-gear fixed upon the shaft, a casing pivotally carried by the shaft, a worm-shaft journaled in the casing and meshing with the worm-gear, a friction-wheel carried by one of the trucks, and adapted to be driven by a wheel of the car and connection between the spindle of such friction-wheel and the worm-shaft.

3. The combination with a railway-car having trucks, of a revoluble lamp mounted upon the car, and mechanism for communicating rotary motion to such lamp from below the car, a worm and gear for actuating such mechanism, an arm pivoted to the truck so as to swing in vertical plane, a friction-wheel carried by the arm so as to rest upon the tread portion of one of the truck-wheels, and yielding connection for transmitting motion from the friction-wheel to the worm and for compensating for the relative movement of the truck and car-body.

In testimony whereof I affix my signature in presence of two witnesses.

JOSEPH J. HARRELL.

Witnesses:
HESTER B. BAIRD,
LOUIS K. GILLSON.